US011516154B2

(12) United States Patent
Vasudeva et al.

(10) Patent No.: US 11,516,154 B2
(45) Date of Patent: Nov. 29, 2022

(54) SYSTEMS FOR MANAGING MESSAGING CONVERSATIONS

(71) Applicant: Apple Inc., Cupertino, CA (US)

(72) Inventors: Tarun Vasudeva, Saratoga, CA (US); Siddhartha Paul, Sunnyvale, CA (US); Amish Mehta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 15/803,444

(22) Filed: Nov. 3, 2017

(65) Prior Publication Data

US 2019/0020606 A1 Jan. 17, 2019

Related U.S. Application Data

(60) Provisional application No. 62/532,293, filed on Jul. 13, 2017.

(51) Int. Cl.
*H04L 12/58* (2006.01)
*H04L 51/02* (2022.01)
(Continued)

(52) U.S. Cl.
CPC .............. *H04L 51/02* (2013.01); *G06F 40/30* (2020.01); *G06Q 10/107* (2013.01); *H04L 51/04* (2013.01);
(Continued)

(58) Field of Classification Search
CPC ......... H04L 51/02; H04L 51/38; H04L 51/36; H04L 51/32; H04L 51/046; G06F 17/2785; G06Q 10/107

See application file for complete search history.

(56) References Cited

U.S. PATENT DOCUMENTS 8,204,799 B1 * 6/2012 Murray .............. G06Q 10/0835
705/26.81
9,294,615 B2 * 3/2016 Lum ................... H04L 65/1006
(Continued)

FOREIGN PATENT DOCUMENTS

CN 1290086 A 4/2001
CN 1802638 A 7/2006
(Continued)

OTHER PUBLICATIONS

International Search Report and Written Opinion from PCT/US2018/040464, dated Sep. 13, 2018, 12 pages.
(Continued)

*Primary Examiner* — Michael Won
(74) *Attorney, Agent, or Firm* — BakerHostetler

(57) ABSTRACT

A system for managing messaging conversations that can be simultaneous and can be maintained across various different autonomous processing systems is described. In one embodiment, the system (operated by or on behalf of a first organization) can include a messaging manager and a first autonomous processing system (first APS) and a second APS. The system can receive a first message and a second message, both directed to the first organization, and the messaging manager can select the first APS to respond to the first message and route the first message to the first APS which can transmit a response to the first message. The messaging manager can select the second APS to respond to the second message and route the second message to the second APS. The messages can be managed asynchronously without a persistent connection during the one or more conversations.

27 Claims, 11 Drawing Sheets

(51) Int. Cl.
*H04L 51/04* (2022.01)
*G06F 40/30* (2020.01)
*H04L 51/52* (2022.01)
*H04L 51/56* (2022.01)
*H04L 51/58* (2022.01)
*G06Q 10/10* (2012.01)
*H04L 51/046* (2022.01)

(52) U.S. Cl.
CPC ............ *H04L 51/046* (2013.01); *H04L 51/52* (2022.05); *H04L 51/56* (2022.05); *H04L 51/58* (2022.05)

(56) References Cited

U.S. PATENT DOCUMENTS

| | | | |
|---|---|---|---|
| 9,716,600 B1* | 7/2017 | Maluf | H04L 51/14 |
| 10,219,122 B1* | 2/2019 | Scanlon | H04W 4/14 |
| 2001/0025309 A1* | 9/2001 | Macleod Beck | G06F 17/2765 |
| | | | 709/223 |
| 2004/0228356 A1 | 11/2004 | Adamczyk et al. | |
| 2004/0254904 A1* | 12/2004 | Nelken | G06F 17/2705 |
| | | | 706/50 |
| 2009/0274290 A1* | 11/2009 | Owens | H04M 3/5237 |
| | | | 379/265.09 |
| 2009/0316879 A1* | 12/2009 | Kuns | H04M 3/22 |
| | | | 379/265.09 |
| 2010/0250680 A1* | 9/2010 | Bhatt | H04L 45/306 |
| | | | 709/206 |
| 2010/0293236 A1* | 11/2010 | Wisner | G06Q 10/107 |
| | | | 709/206 |
| 2010/0318812 A1 | 12/2010 | Auradkar et al. | |
| 2011/0151838 A1* | 6/2011 | Olincy | H04M 1/64 |
| | | | 455/412.1 |
| 2011/0208822 A1 | 8/2011 | Rathod | |
| 2011/0252108 A1* | 10/2011 | Morris | H04L 51/32 |
| | | | 709/206 |
| 2012/0036201 A1* | 2/2012 | Cole | H04L 51/32 |
| | | | 709/206 |
| 2013/0066988 A1 | 3/2013 | Levinson | |
| 2013/0097269 A1* | 4/2013 | Plotkin | H04L 51/02 |
| | | | 709/206 |
| 2013/0279690 A1 | 10/2013 | Durham et al. | |
| 2014/0245025 A1 | 8/2014 | Fairless | |
| 2015/0026604 A1* | 1/2015 | Mulukuri | G06Q 50/01 |
| | | | 715/758 |
| 2015/0100581 A1* | 4/2015 | O'Donnell | H04L 67/10 |
| | | | 707/737 |
| 2015/0244653 A1* | 8/2015 | Niu | H04L 51/02 |
| | | | 715/752 |
| 2015/0262238 A1* | 9/2015 | Aitchison | G06F 16/335 |
| | | | 705/14.6 |
| 2015/0310446 A1 | 10/2015 | Tuchman | |
| 2015/0312409 A1* | 10/2015 | Czarnecki | H04M 3/42382 |
| | | | 455/414.1 |
| 2015/0334176 A1* | 11/2015 | Brouk | G06Q 10/10 |
| | | | 726/6 |
| 2016/0132608 A1* | 5/2016 | Rathod | G06F 16/9535 |
| | | | 707/722 |
| 2016/0255139 A1* | 9/2016 | Rathod | G06F 16/9535 |
| | | | 709/203 |
| 2017/0104863 A1* | 4/2017 | Turim | H04L 51/38 |
| 2017/0171117 A1* | 6/2017 | Carr | H04L 51/02 |
| 2017/0180303 A1* | 6/2017 | Debris | H04L 51/36 |
| 2017/0187666 A1* | 6/2017 | Schmid | H04L 51/32 |
| 2018/0033019 A1* | 2/2018 | Mora | G06Q 30/016 |
| 2019/0020606 A1* | 1/2019 | Vasudeva | G06F 17/2785 |
| 2019/0097954 A1* | 3/2019 | Hajdu | H04L 51/02 |
| 2019/0156256 A1* | 5/2019 | Argyros | G06Q 10/0635 |
| 2019/0163692 A1* | 5/2019 | Duan | G06F 16/334 |

FOREIGN PATENT DOCUMENTS

| | | |
|---|---|---|
| CN | 101035124 A | 9/2007 |
| CN | 101931659 | 1/2010 |
| CN | 104350722 | 2/2015 |
| EP | 0889398 | 1/1999 |
| EP | 0978056 | 10/2004 |
| WO | 2016164253 A1 | 10/2016 |
| WO | 2016187529 A1 | 11/2016 |

OTHER PUBLICATIONS

Genesys "Conversation Manager", Product Datesheet, 2016, 2 pages.
Genesys "the new conversation", Genesys Conversation Manager, Sep. 12, 2012, 8 pages.
Sekiba, et al., "Design and Implementation of Agent-based Flexible Asynchronous Messaging System," Proceedings 1998 International Conference on Parallel and Distributed Systems (Cat. No. 98TB100250), 1998, pp. 732-739.
Yuan, et al., "High Performance Cluster Autonomic Management System Research," cited in Chinese Notice of Allowance dated Feb. 18, 2022, including English language abstract.
Chinese Notice of Allowance from 201880046484.X, dated Feb. 18, 2022, 6 pages including English language translation.
European Office Action from European Patent Application No. 18743663.9 dated Nov. 27, 2021, 3 pages.
Chinese Office Action from Chinese Patent Application No. 201880046484.X, dated Jun. 3, 2021, 29 pages including English language translation.

* cited by examiner

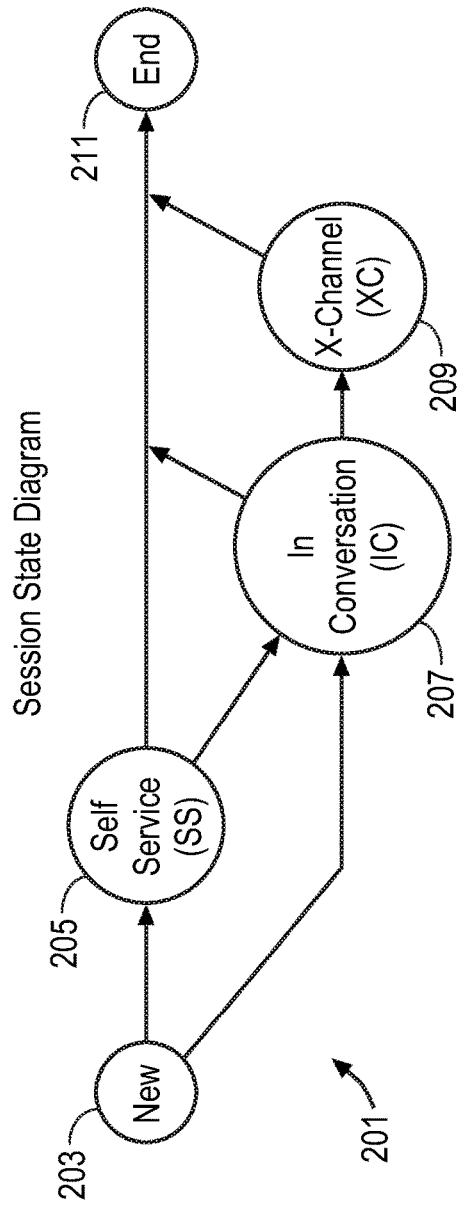

Session State Diagram

FIG. 5A

Live Support Routing Table

| Current State | Condition | Next State | Specialist | Notes |
|---|---|---|---|---|
| Live Support | New Message | Live Support | Specialist 1 | Based On Longest Waiting |
| Live Support | Nth Message | Live Support | Specialist 1 | |
| Live Support | Session Timed Out | Live Support | Specialist 1 | Specialist 1 Preferred If Available |
| Live Support | Session Timed Out | Live Support | Specialist N | If Specialist 1 Is Busy |
| Live Support | After Hours | After Hours | - | Message Queued |
| Live Support | Conversation Timed Out | Self Service Bot | - | |

FIG. 5B

Async Routing Table

| Current State | Decision Table | | | Next State | Notes |
| --- | --- | --- | --- | --- | --- |
| | Conversation Timeout | Session Timeout | HandOff Requested | | |
| New | N/A | N/A | N | Self Service Bot | |
| Self Service Bot | N | N/A | N | Self Service Bot | |
| Self Service Bot | N | N/A | Y | Self Service Bot - Retail | |
| Self Service Bot - Retail | N | N/A | N | Self Service Bot - Retail | |
| Self Service Bot - Retail | N | N/A | Y | Self Service Bot - AppleCare | |
| Self Service Bot - AppleCare | N | N/A | N | Self Service Bot - AppleCare | |
| Self Service Bot - AppleCare | N | N/A | Y | Live Support | |
| Self Service Bot - Retail | N | N/A | Y | Live Support | |
| Live Support | N | N | N | Live Support | |
| Live Support | N | N | Y | Self Service Bot | |
| Live Support | N | Y | N | Live Support | May Go To The Same Or New Specialist |
| Live Support | Y | N/A | N | Self Service Bot | |
| Self Service Bot | Y | N/A | N | Self Service Bot | |
| Self Service Bot - Retail | Y | N/A | N | Self Service Bot | |
| Self Service Bot - AppleCare | Y | N/A | N | Self Service Bot | |

Example Policy For Selecting A Target
Autonomous Processing System

| Domain | Intent | State | Target APS |
|---|---|---|---|
| Retail Sales | All | Self Service | APS 1 |
| Service | All | Self Service | APS 2 |
| Consumer Support | All | Self Service | APS 3 |

FIG. 6A

Example Conversation Timeouts

| Domain | Intent | State | Conversation Timeout |
|---|---|---|---|
| Retail Sales | Buy | All | 48 Hours |
| Service | Store Locator | All | 4 Hours |
| Consumer Support | All | All | 24 Hours |

FIG. 6B

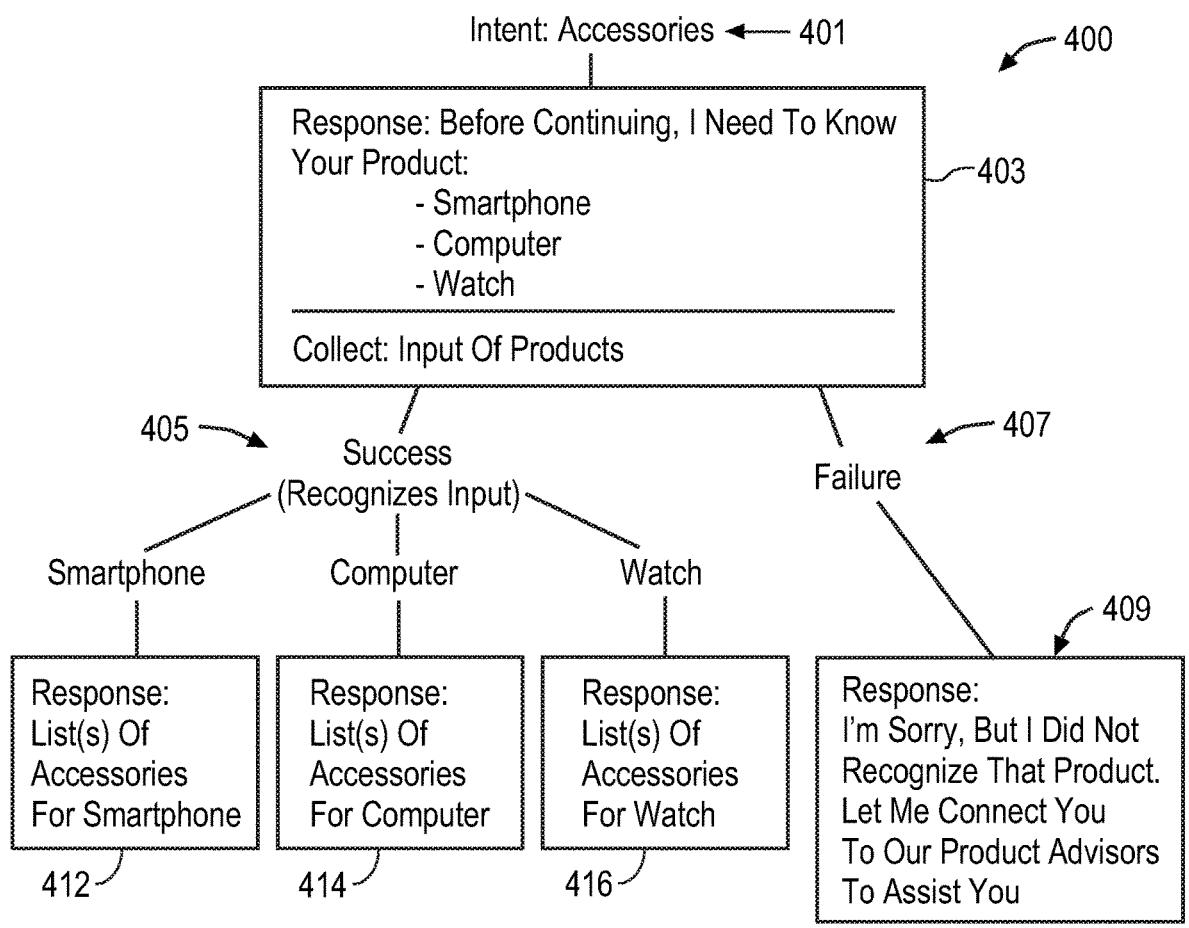

Conversation And Session Data

| | |
|---|---|
| Customer ID | Session Information |
| Media Type (Messaging Platform) | Pay Provisioned |
| Conversation ID | Customer ID Binding |
| Session ID | Original Intent |
| Business Unit ID | Intent |
| State | Last Update Time |
| c Start | Locale / Location |
| c End | Message Sequence Number |
| s Start | Domain |
| s End | Disposition |
| | Disposition Message |

FIG. 8

SYSTEMS FOR MANAGING MESSAGING CONVERSATIONS

This application claims the benefit of U.S. Provisional Patent Application No. 62/532,293, filed Jul. 13, 2017, which is incorporated herein by reference.

BACKGROUND

The embodiments described herein relate to systems that exchange messages, and can include embodiments that are used to exchange messages between a business entity, or other organization, and its customers or users.

Conventional web chat systems allow a business to provide sales support (e.g., help with selecting a new purchase) or service support (e.g., help with fixing a problem with a product from the business) to its customers. The customers can use a web browser that is directed to a business's web site which supports web chat, and the customers can exchange messages (e.g., messages seeking help to fix a problem) through the web site with human advisors or assistants that work for the business. These conventional web chat systems require synchronous sessions to exchange messages between the entities in the conversation. A synchronous session or communication can be defined as a communication session in which a persistent connection is maintained while both systems used in the communication session are maintained in an on-line state such as through a persistent web socket or TCP socket based connection. The exchanging of messages is achieved through the persistent connection established between two end points. An asynchronous session or communication can be defined as a communication session in which there is no persistent connection or there is no need for a persistent connection, and messages are stored and then forwarded along a communication channel or path.

SUMMARY OF THE DESCRIPTION

Systems for managing messaging conversations are described. In one embodiment, a system can manage multiple simultaneous conversations, each of which can be maintained across multiple different autonomous processing systems. The system can, in one embodiment, support asynchronous communication of the multiple simultaneous conversations such that, for each conversation, the connection for the conversation is not persistent and the messages in the conversation are stored and forwarded in the communication path and the system, in one embodiment, can also support synchronous communication of messages through a persistent connection. In one embodiment, the system can include a messaging manager and a first autonomous processing system (first APS) and a second APS, and the system can be operated by or on behalf of an organization such as a business. The system can receive a first message and a second message both directed to the organization, and the messaging manager can select the first APS to respond to the first message and can route the first message to the first APS which can then transmit a response to the first message. The messaging manager can select the second APS to respond to the second message and can route the second message to the second APS which can then transmit a response to the second message. The first message and the second message can be from different customers and be received simultaneously and processed concurrently. The system can include a set of message adaptors, each configured to receive and send messages on a particular messaging platform. In one embodiment, the first APS can be configured to process and respond to messages of a first type (e.g., a first intent) and the second APS can be configured to process and respond to messages of a second type (e.g., a second intent). In one embodiment, an autonomous processing system (APS) can be a data processing system (e.g., a server computer or a processing core in a microprocessor) that is configured to receive inputs, such as metadata from the messaging manager and content of a message from a customer, and provide one or more outputs based on those inputs. In one embodiment, the APS can operate independently of other systems such as other APSs and the messaging manager, and processing logic in the APS can be implemented as a decision tree or state machine to process the inputs and provide the one or more outputs. The outputs can include responses to messages from customers or a request to transfer the message from a customer to another APS or to a human assistant or advisor.

In one embodiment, the messaging manager is configured to select the first autonomous processing system to respond to the first message based on metadata associated with the first message, which metadata indicates the first message is of a first type or first intent. Similarly, in one embodiment the messaging manager can be configured to select the second autonomous processing system to respond to the second message based on metadata associated with the second message, where the metadata associated with the second message indicates that the second message is of a second type or second intent. In one embodiment, the messaging manager identifies conversations based upon a customer identifier (ID) that is associated with one or more of (1) one or more social media handles of a customer; or (2) one or more email addresses of the customer; or (3) one or more phone numbers of the customer; or (4) a business identifier. The business identifier can come from the customer's use of a web page or an application or other source/portal used by the customer, and the web page or application or other source/portal used by the customer can send a message that contains the business identifier to the messaging system described herein. In one embodiment, the messaging manager can use a set of policies to control the state of the sessions and conversations. For example, the messaging manager can use conversation timeouts to change the state of a conversation to a new conversation state while retaining metadata about a prior conversation with the same customer.

A method in one embodiment performed by one or more data processing systems can include the following operations: receiving a first message directed to a first organization; selecting a first autonomous processing system to respond to the first message; routing the first message to the first autonomous processing system; transmitting a response, from the first autonomous processing system, to the first message; receiving a second message directed to the first organization; selecting a second autonomous processing system to respond to the second message; routing the second message to the second autonomous processing system; and transmitting a response, from the second autonomous processing system, to the second message. In one embodiment, the selection of the first and second autonomous processing systems can be performed by a messaging manager that manages communication of messages asynchronously without a persistent connection during conversations that include the messages and the messaging manager can also support and manage communication of messages synchronously with a persistent connection. In one embodiment, the first APS is configured to respond to messages of a first type or first intent and the second autonomous processing system is configured to respond to messages of a second type or second intent. In one embodiment, the first APS is configured to update first metadata for a first conversation of the first type, and the second APS is configured to update second metadata for a second conversation of the second type. In one embodiment, the messaging manager is configured to store the updated first metadata after the response to the first message has been transmitted and is configured to store the updated second metadata after the response to the second message has been transmitted. In one embodiment, the first type is for a customer interaction of a first intent or purpose and the second type is for a customer interaction of a second intent or purpose.

In one embodiment, the messaging manager creates new metadata for a new conversation in response to determining a message, such as the first message or the second message is an initial message in a new conversation.

In one embodiment, the selection by the messaging manager of the first APS is based on the first metadata that is associated with the first message, and the selecting by the messaging manager of the second autonomous processing system is based on the second metadata that is associated with the second message. In one embodiment, the first autonomous processing system is configured for generating responses by a first business unit within the first organization, and the second autonomous processing system is configured for generating responses by a second business unit within the first organization. In one embodiment, the first message can be received through a first messaging platform, and the second message can be received through a second messaging platform that is different than the first messaging platform. In one embodiment, the first messaging platform and the second messaging platform can be any one of: text (SMS) messaging; or iMessage; or web chat; or chat within an application; or email; or voice; or Twitter; or WeChat; or Facebook Messenger; or Snapchat; or voice messaging; or video messaging; or Viber; or Line; or Telegram; or kik; or Skype; or Slack; or Kakao; or Amazon Alexa; or Google Assistant; or WhatsApp; or Apple Business Chat; or Instagram; or Mailgun; or Twilio SMS; or HipChat. WebChat and voice telephone calls are examples of what can be considered messaging over synchronous communication channels. SMS/text, iMessage, email, and Apple Business Chat are examples of what can be considered messaging over asynchronous communication channels. For asynchronous communication channels, in one embodiment, it is not necessary for a customer to have open (e.g., launched and executing) a messaging application or a web browser that is waiting for a response; in this instance, a customer can typically send a message and the response from the messaging system of the first organization can be delivered through the messaging platform's push notification services (so the customer's device can, for example, receive and present the notification through a daemon).

In one embodiment, the first message can be received through a first messaging platform from a first customer and the second message can be received through a second messaging platform from the first customer, the first message and the second message being part of the same conversation, and the second message represents a cross-channel message. In another embodiment, the first message can be received from a first messaging platform from a first customer engaged in a first conversation of a first intent, and the second message is concurrently received through a second messaging platform from a second customer engaged in a second conversation of a second intent which is different than the first intent.

In one embodiment, the routing can be performed by a messaging manager and can be dependent on a combination of session state and data specifying customer intent. In one embodiment, all routing of messages in the system can be specified by the session state and data specifying customer intent for each message, and the routing can be performed without a persistent communication connection or channel during each conversation. In one embodiment, the routing can be based upon data in a customer relationship management (CRM) system that contains information about one or more customers; for example, an enterprise customer may have data about the customer that is used to route messages from or to that enterprise customer. Other combinations of data, such as domain data, session state and data specifying customer intent can also be used to determine how to route messages.

In one embodiment, the first APS can receive a third message routed to the first APS and can determine the third message cannot be processed by the first APS, and the first APS can then forward, in effect, the third message to at least one of another APS or a messaging manager or a human customer service assistant or advisor. In one embodiment, the first APS can indicate to the messaging manager that it cannot process the third message, and the messaging manager can then cause the third message to be delivered to the another APS or to a human customer service assistant. In one embodiment, the first message and the second message are part of a single conversation that is maintained across either (1) the first autonomous processing system and the another autonomous processing system if the third message is, in effect, forwarded to the another APS or (2) the first autonomous processing system and the human customer service assistant if the third message is, in effect, forwarded to the human customer service assistant.

In one embodiment, the first message is from a first customer that is identified, within the first organization, by a first customer identifier, and the first customer identifier is associated with (e.g., bound to) one or more of: (1) one or more social media handles, or (2) one or more email addresses, or (3) one or more phone numbers, or (4) a business identifier, and wherein the association allows the first organization to determine the customer identifier from the first message.

In one embodiment, the first APS and the second APS do not retain metadata about a conversation after providing an output such as a response for the conversation. In one embodiment, after the completion of the processing to provide the output from either the first APS or the second APS, updated metadata is provided to the messaging manager. For example, after the response to the first message has been transmitted, the first APS can provide updated first metadata to be stored by the messaging manager for the first conversation and the first APS does not retain that updated first metadata. Similarly, the second APS does not retain the updated second metadata after the response to the second message is transmitted, and the messaging manager retains and stores the updated second metadata. This allows the first and the second APS to operate in a stateless fashion. When a new message in the conversation is directed to the first APS, the messaging manager can provide the updated first metadata to the first APS to continue the conversation and to restore the state information within the first APS.

In one embodiment, the method can include the following further operations: storing time data for each message in a conversation; comparing the time data to one or more conversation timeout values; changing a state of the conversation if the time data indicates a time between consecutive messages in the conversation exceeds the one or more conversation timeout values. In one embodiment, the state of the conversation is changed to a new conversation state and the metadata for the conversation is stored to allow a new conversation to resume using a set of information stored in the metadata. In one embodiment, the metadata can include one or more of: (1) identifier of one or more human assistants or advisors involved in the conversation before the state was changed; or (2) identifier of one or more possible purchases of products or services involved in the conversation before the state was changed. In one embodiment, a first timeout value for a first conversation of a first intent differs from a second timeout value for a second conversation of a second intent. In one embodiment, a third timeout value for a third conversation conducted over a first messaging platform can differ from a fourth timeout value for a fourth conversation conducted over a second messaging platform. For example, timeout values can be longer durations for email messaging platforms than timeout values for text messaging or other similar messaging platforms.

Each message in a conversation can have a unique sequence number within the conversation to identify a sequence in time of receipt of the messages and wherein the conversation is associated with a conversation identifier that identifies the conversation from the start of the conversation to the end of the conversation.

In one embodiment, the messaging manager stores session data that includes the first metadata before the response to the first message is transmitted and includes the updated first metadata after the response to the first message has been transmitted. At least a portion of the session data is provided to the first APS prior to transmitting the first message. In one embodiment, the session data can include one or more of: (1) session state; (2) identifier of human assistant in most recent response; (3) time data for the last message and indicator of sender of the most recent message; (4) conversation identifier; (5) intent of a conversation; (6) metadata from the first autonomous processing system; (7) message sequence numbers; (8) customer identifier; or (9) customer location and/or locale.

The methods and systems described herein can be implemented by data processing systems such as desktop computers, server systems, and other data processing systems and other consumer electronic devices. The methods and systems described herein can also be implemented by one or more data processing systems which execute executable computer program instructions, stored on one or more non-transitory machine readable media that cause the one or more data processing systems to perform the one or more methods described herein when the program instructions are executed. Thus the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 5A shows an example of a session state diagram according to one embodiment.

FIG. 5B shows an example of a routing table which can be used by a messaging manager to route conversations with human assistants or advisors.

FIG. 5C is an example of a routing table that can be used by a messaging manager according to one embodiment described herein.

FIG. 5D shows an example of a set of message adaptors which can be used with one or more embodiments described herein.

FIG. 6A shows an example of a policy for selecting a target APS according to one embodiment.

FIG. 6B shows an example of conversation timeouts which can be used according to one embodiment.

FIG. 6C shows an example according to one embodiment of payload session data.

FIG. 7 shows an example of a decision tree which can be used by an autonomous processing system according to one embodiment.

FIG. 8 shows an example of conversation and session data that can be maintained by a messaging manager for each conversation in the system according to one embodiment.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
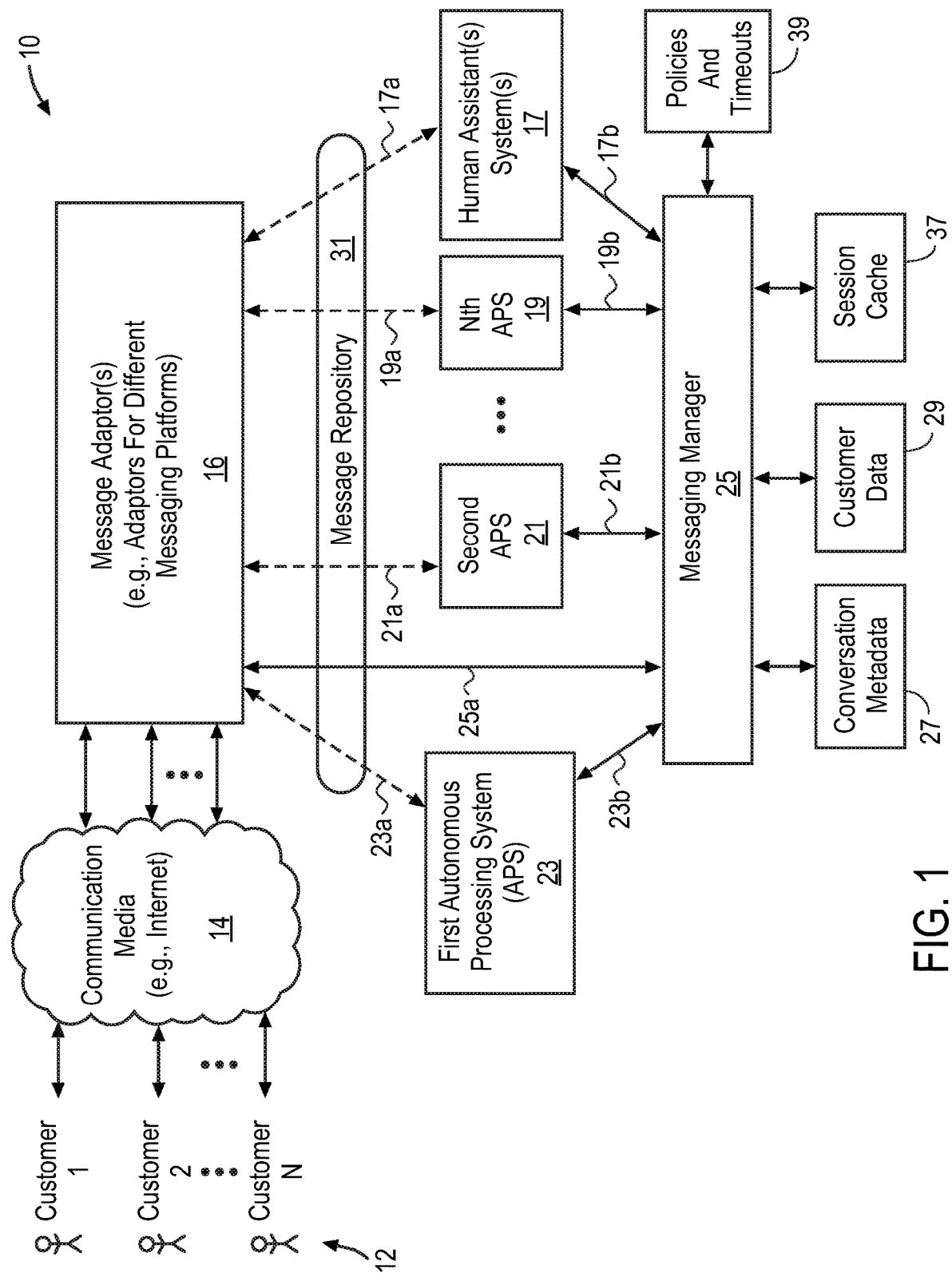
FIG. 1 shows an example of a system for managing messaging conversations in one embodiment.

FIG. 1 shows an example of a messaging system for managing multiple messaging conversations which can be simultaneous conversations through one or both of synchronous and asynchronous communication channels. The system can manage the conversations using algorithms and configurable policies for timeouts. The messaging conversation can be text, rich media, audio or video formats. The messaging system 10 shown in FIG. 1 can include one or more message adaptors 16, a messaging manager 25, a message repository 31, a set of autonomous processing systems, such as a first APS 23, a second APS 21 and an nth APS 19. The messaging system 10 also includes one or more human assistant systems 17 which are operated by human assistants or advisors to provide help to customers such as customers 12 which communicate with the message adaptors 16 through communication media 14. In one embodiment, the messaging manager 25 can store data about the conversations and about customers and about sessions for use in processing and managing the conversations. For example, the messaging manager 25 can be coupled to a persistent storage of conversation metadata in storage 27, and a persistent storage of customer data in storage 29, and a storage or cache of session information in storage 37. In addition, the messaging manager 25 can use data representing policies and conversation timeouts 39 to manage the messages as described further herein.

The set of customers 12 can be customers of a business or users of an organization, and the messaging system 10 can be operated by or on behalf of the business or organization. The customers 12 can seek help from automated systems or human assistants by using the messaging system and can also place orders to buy products or services through the messaging system 10 and can also track the status of an order for a new product or service by using the messaging system 10. The one or more customers 12 can be connected or coupled to the messaging system 10 through a communication media which can include a plurality of different media, including for example the Internet. Communication media can also include conventional telephone service (POTs), etc. The message adaptor 16 can be a set of message adaptors, wherein there can be one message adaptor for each of the different messaging platforms. In one embodiment, the messaging platforms can include one or more of: text (SMS) messaging; or iMessage; or web chat; or chat within an application; or email; or voice such as voice over conventional telephone service or voice over IP telephone service; or Twitter; or WeChat; or Facebook Messenger; or Snapchat; or voice messaging; or video messaging, or other messaging platforms referred to herein. In one embodiment, each message adaptor is adapted or configured to process messages by both receiving messages for a particular messaging platform and sending or transmitting responses to those messages for a particular messaging platform. The message repository 31 can be a persistent non-volatile storage that stores messages both that are received by the messaging system 10 and sent by the messaging system 10 from each APS, such as first APS 23, second APS 21, and nth APS 19 as well as messages sent by a human assistant or advisor through a human assistant system 17 operated by that human assistant or advisor. The messaging manager 25 in one embodiment can coordinate and manage the operation of the messaging system 10 through the use of metadata that is created and updated over time during each conversation. The storage 27 can store this conversation metadata which is used as described further below to manage the exchange of messages in each conversation. Storage 29 can store customer data that is used in one embodiment to identify customers in the ways described further below Storage 37 can be a cache which stores session data such as the conversation and session data shown in FIG. 8 in one embodiment. Storage 39 can store policies and conversation timeouts and session timeouts which can be used as described further below.

Figure 2:
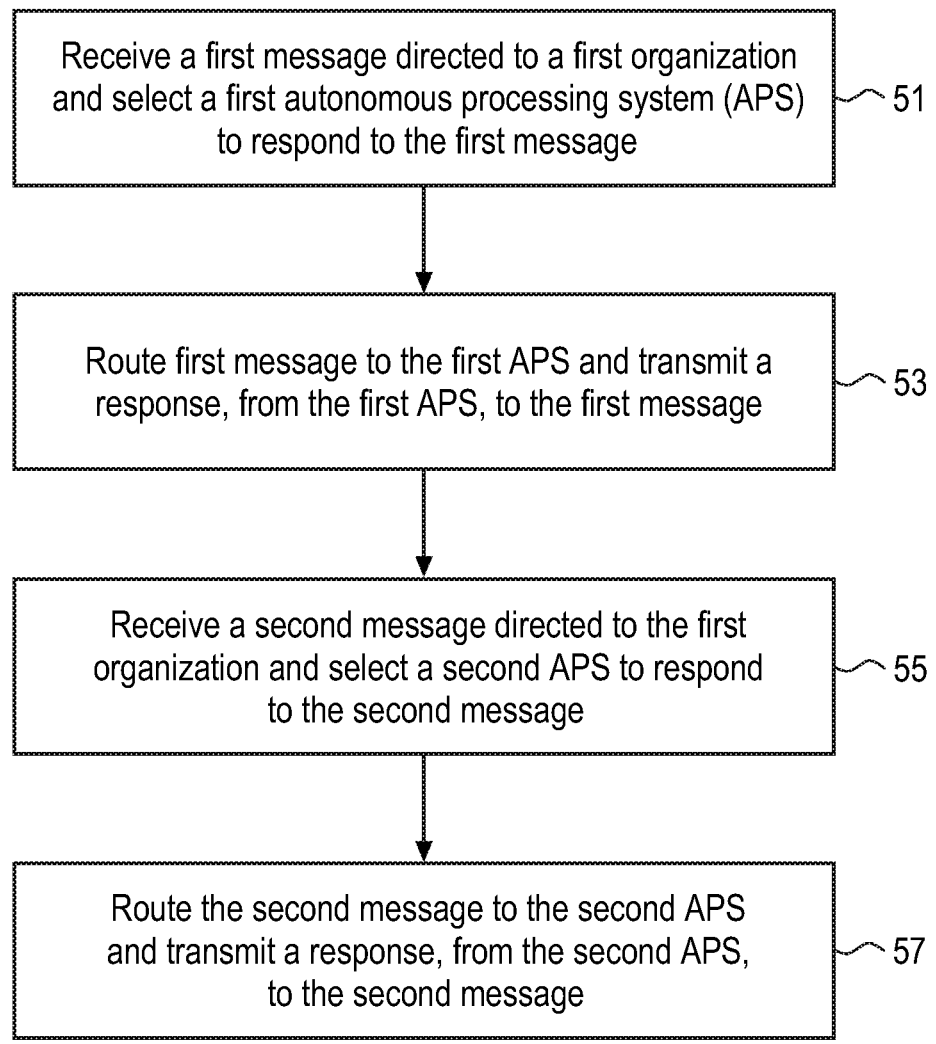
FIG. 2 is a flowchart which shows a method according to one embodiment.
Figure 4:
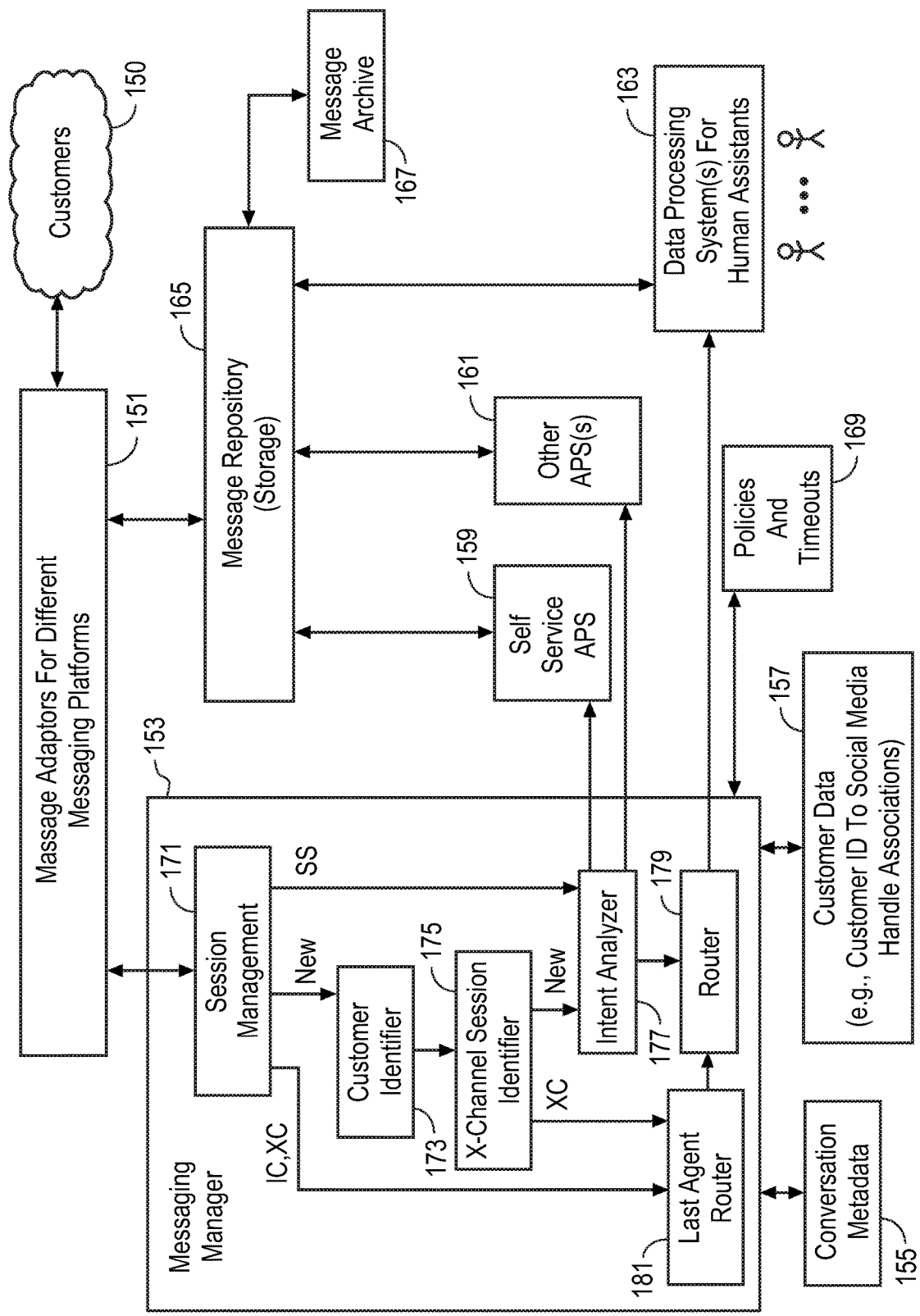
FIG. 4 shows an example of a system for managing messaging conversations for an organization such as a business.

FIG. 2 shows a method which can be performed by messaging system 10 or by the messaging system shown in FIG. 4. In operation 51, a messaging system can receive a first message directed to a first organization, such as a business and select a first autonomous processing system to respond to the first message. For example, referring to FIG. 1, the set of message adaptors 16 can receive the first message and provide metadata about that first message to the messaging manager 25 which can use that metadata (e.g., a customer's social media handle) to select the first autonomous processing system, such as first APS 23 to respond to the first message. In one embodiment, the customer identifier can be associated with or bound to a social media handle that is contained in the received message (e.g., first message); this can allow the messaging manager 25 to use the social media handle to look up the corresponding customer identifier in storage 29) and then to search the conversation metadata in storage 27 to determine the state of the conversation (and optionally other information) in order to select a particular APS or human assistant to respond to the message. Referring back to FIG. 2, in operation 53, the first message can be routed to the first APS, such as first APS 23 which can then transmit a response, from the first APS to the first message. In one embodiment, the first APS, such as first APS 23 receives the message from the message repository 31 and provides a response to the message adaptor 16 while also storing the transmitted response into the message repository 31. In operation 55, the messaging system can receive a second message which is directed to the first organization and select a second APS to respond to the second message. In one embodiment, the first and the second message can be simultaneous messages or nearly simultaneous messages from different customers; in another embodiment, the first message and the second message can be two messages in sequence in time from the same customer. In operation 57, the second message can be routed to the second APS, and the second APS can transmit a response or cause the response to be transmitted to the second message. In one embodiment, the messaging manager 25 can perform the routing operation based upon metadata in the second message which can be used to select the second APS for processing of the second message in order to prepare a response to the second message. In one embodiment, each APS can be configured or implemented through processing logic that resembles a decision tree, such as the decision tree shown in FIG. 7 which will be described further below.

Figure 3:
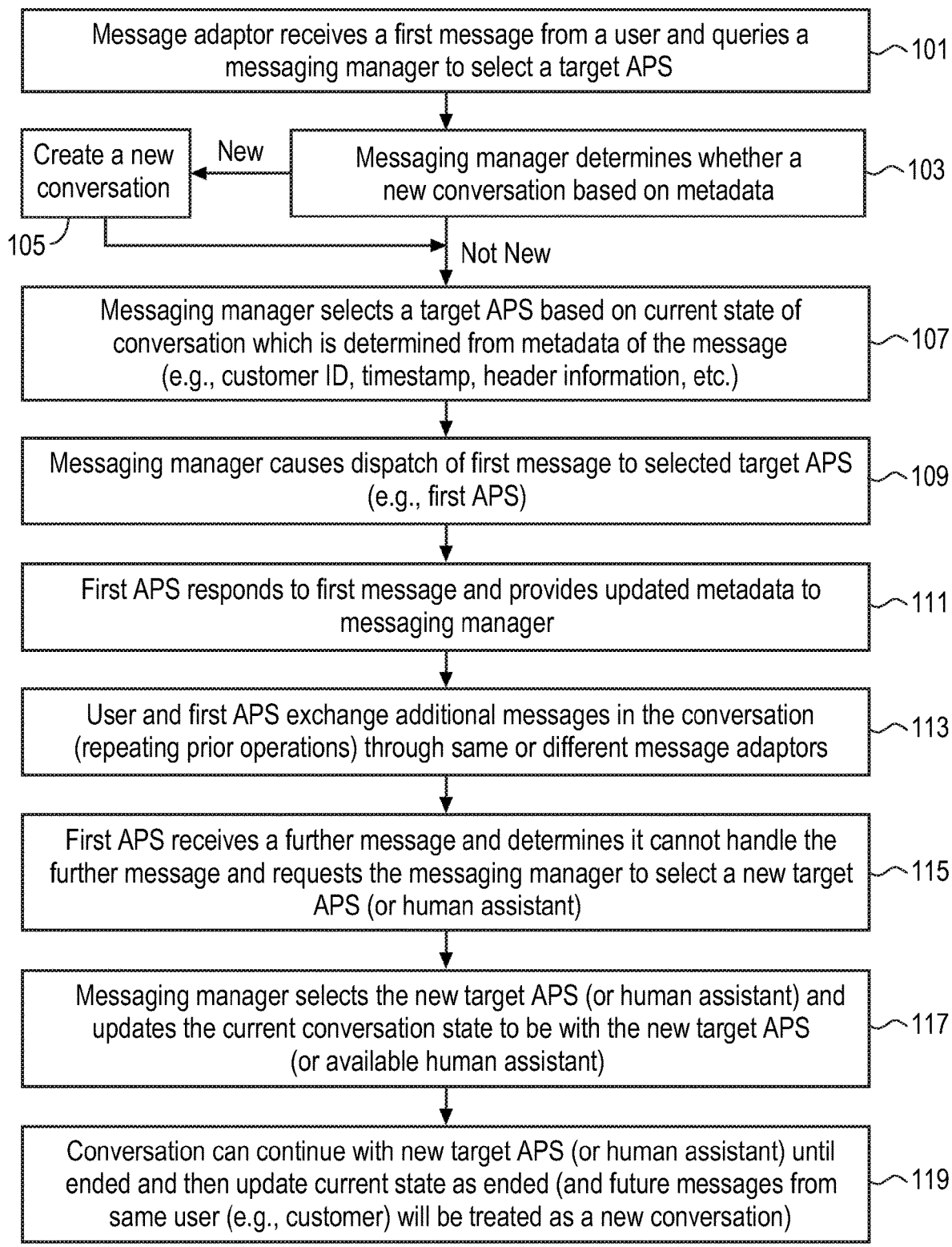
FIG. 3 is a flowchart which shows a method according to one embodiment described herein.

FIG. 3 shows a more detailed example of a method which can be performed with messaging system 10 shown in FIG. 1 or the messaging system shown in FIG. 4. In the example shown in FIG. 3, the messaging system uses metadata about conversations, such as state information to maintain a single conversation across multiple autonomous processing systems which can be stateless and use the messaging manager to manage the states and to store metadata about the states for each conversation. Referring to FIG. 3, in operation 101, a message adaptor receives a first message from a user or customer and queries a messaging manager to select a target APS. Referring to FIG. 1, the message adaptor for the particular messaging platform can query messaging manager 25 through link 25A by providing metadata (such as a social media handle or other information which can be associated with a customer identifier) in order to determine whether or not an existing conversation with that identified customer (identified by the customer identifier) exists. In operation 103, the messaging manager can determine whether the first message is a message in a new conversation based upon the metadata, such as the metadata 27 in FIG. 1 stored in storage 27. If the metadata, such as the customer's social media handle indicates a conversation already exists, then the conversation is not new and processing proceeds to operation 107. On the other hand, if there is no existing conversation with the identified customer which has been identified by the association between the social media handle (or other data in the first message) then the messaging manager 25 creates a new conversation 105 by creating metadata for the new conversation which can be similar to the data shown in FIG. 8 in order to track the conversation over time. Following the creation of the new conversation in operation 105, processing proceeds to operation 107. In operation 107, the messaging manager, such as messaging manager 25 or messaging manager 153 shown in FIG. 4 selects a target APS based on the current state of the conversation which is determined from the metadata of the message; in one embodiment, this metadata can include the customer identifier, time stamp information, header information, previous date of the conversation, etc. In one embodiment, information about time between messages in a conversation can be used to determine whether or not to change a state of the conversation. For example, the information about time can be compared against conversation timeout values or session timeout values to determine whether or not to change a state of the conversation based upon the comparison between the time information and one or more conversation timeout values or session timeout values, etc. The use of conversation timeouts and session timeouts will be described further below in conjunction with FIG. 5C and FIG. 6B. In one embodiment, the process used by a messaging manager to select a target APS in operation 107 of FIG. 3 can use a policy such as the example policy shown in FIG. 6A for selecting a target APS. In one embodiment, a target APS can be selected based upon a domain and an intent. The domain can be indicated by metadata in the message indicating an origination or source of the message, such as a retail sales website of the business or a service website of the business or a customer support website or webpage of the business. In one embodiment, the intent can be determined from metadata in the message and, in some embodiments, from the content of the message which can be processed by a natural language processing system to extract a customer's intent or purpose with respect to the message. For example, the customer may ask a question about accessories for a phone which would indicate an intent or purpose of, for example, obtaining product information for a purchase of the accessory or obtaining service information about the accessory. In another embodiment, the routing which can be driven by an example policy, such as the example policy shown in FIG. 6A can use or be based upon the domain, the intent, and the state of the conversation in order to select a target APS. It can be seen from FIG. 6A that each domain of the three domains shown in FIG. 6A in effect selects the target APS in the example shown in FIG. 6A. In one embodiment, each domain may be controlled by a business unit within the business which can configure their own webpages and also configure their own autonomous processing systems to respond to messages from customers that are directed to that domain. For example, the retail sales business unit within a business can configure its webpages and configure its autonomous processing systems independently of and separately of other business units which can perform similar operations by configuring their own webpages and autonomous processing systems. This allows each business unit flexibility and a level of control within the messaging system in one embodiment.

Referring back to FIG. 3, after the messaging manager selects a target APS in operation 107, the messaging manager in operation 109 causes the dispatch of the first message to the selected target APS, such as the first APS. Referring to FIG. 1, messaging manager 25, if implementing operation 109, can cause the dispatch of the first message to first APS 23 through the link 23A between the message adaptor and the first APS 23. In one embodiment, received and transmitted messages can be stored in message repository 31, and each of the APS 23, 21, and 19 as well as the human assistant system 17 can read from and write to the message repository 31 in order to receive messages and transmit messages through their links, such as link 21A, 19A, and 17A. In one embodiment, operation 109 can also include providing metadata about the conversation that includes the first message, and this metadata can be provided over, in one embodiment, the links 23B, 21B, 19B, and 17B to the appropriate APS or human assistant system 17. Referring back to FIG. 3, in operation 109, the messaging manager can provide metadata about the conversation that includes the first message to the first APS, such as first APS 23 through link 23B as part of operation 109. In operation 111, the first APS can respond to the first message and provide updated metadata to the messaging manager. Referring back to FIG. 1, the first APS 23 can respond to the first message by transmitting a response through link 23A (and causing storage of the transmitted response in message repository 31), and can provide the updated metadata through link 23B to the messaging manager 25. The updated metadata can reflect updated information about the conversation, such as a current state or new state and other data about the conversation. In one embodiment, each APS may also provide private data about the conversation which is used by the APS. In one embodiment, each APS can be stateless so that after the updated metadata is provided to the messaging manager, the updated metadata can be erased at the APS so that it can return to a stateless situation with respect to the conversation at the APS which just transmitted the response.

Referring back to FIG. 3, in operation 113, the user or customer and the first APS can exchange additional messages in the conversation through the same or different message adaptors for the same or different messaging platforms. For each additional message within operation 113, the prior operations, such as operations 101, 103, 107, 109 and 111 can be repeated. In operation 115, the first APS can receive a further message (after the additional messages of operation 113) and can determine that it cannot handle the further message and can request the messaging manager to select a new target APS or human assistant or advisor. This can be referred to as a requested handoff. Each APS can have in one embodiment the capability to cause the transfer of the conversation with the same customer to a different APS or to a human assistant. FIG. 7 shows a decision tree which allows an APS to cause the selection of a new target APS or human assistant. Referring back to FIG. 3, in operation 117, the messaging manager selects the new target APS (or human assistant) and updates the current conversation state to be with the new target APS or available human assistant who can be specified by name. As shown in operation 119, the conversation can continue with a new target APS or human assistant until ended by the target APS or the human assistant, and in response to ending the conversation, the current state of the conversation is updated to indicate that it has ended which will cause future messages from the same user or customer to be treated as a new conversation.

FIG. 4 shows an example of a messaging system which includes a set of message adaptors for different messaging platforms as well as a messaging manager 153 and other components which are similar to the components shown in FIG. 1. It will be appreciated that in one embodiment, the components with the same labels in FIGS. 1 and 4 perform similar functions in both FIG. 1 and FIG. 4. For example, the message repository 165 stores messages received and messages transmitted by the messaging system. Similarly, the messaging manager 153 performs operations which are similar to messaging manager 25. The set of customers 150 communicate with the messaging system through a communication media, such as the Internet to send and receive messages. The set of message adaptors 151 are coupled to the message repository 165 to allow received messages to be stored in the message repository 165 and to allow responses to be transmitted from the message repository 165 or through the message repository 165. The message adaptors 151 are also coupled to the messaging manager 153 to provide metadata about the conversation to the messaging manager 153 to allow the messaging manager to perform its functions as described herein, such as the functions described in conjunction with FIGS. 2 and 3 described above. The messaging manager 153 can select a target APS or a data processing system of a human assistant as described above; in particular, the messaging manager 153 can select the self-service APS 159 or other APS 161 which can be a set of one or more other autonomous processing systems. Similarly, depending on the policy for selecting a target autonomous processing system, the messaging manager 153 can also select one or more data processing systems used by human assistants, such as the one or more data processing systems 163. APS 159 and the set of one or more APSs 161 and the set of data processing systems 163 are coupled to the message repository 165 in order to receive messages from customers and also to transmit responses back to those customers. In one embodiment, the message repository 165 can be coupled to a message archive 167 which can be a long-term archive of messages sent and received by the messaging system shown in FIG. 4 as part of providing service and sales to customers of the organization which uses the messaging system shown in FIG. 4.

The messaging manager 153 can include several logical components as shown in FIG. 4 that are used to process metadata about a conversation in order to select a target APS or human assistant and in order to route or cause the routing of messages to a target APS or data processing system for a human assistant. As described above, the messaging manager 153 can use conversation message metadata stored in storage 155 as well as customer data stored in storage 157 and the policies and timeout values stored in storage 169 in order to perform the selection of a target APS or human assistant. Session management 171 in the messaging manager 153 can receive metadata about a particular message from a message adaptor, and can use that metadata to determine a current state of the conversation. In one embodiment the current states can include a self-service state (SS), a new state, an in-conversation state (IC), and a cross-channel state (XC). Based upon the state identified from the metadata, session management 171 can route the metadata to other components within the messaging manager 153 as shown in FIG. 4. In particular, a conversation which has the new state is routed to a customer identifier 173 which can identify the customer based upon customer data in storage 157 to determine the customer identifier that is bound to, for example, a social media handle of the customer. Customer identifier 173 can then provide the customer identifier to the cross channel session identifier 175 to route processing to either intent analyzer 177 through the new state or to the last agent router 181 through the cross channel state. In one embodiment, the cross channel session identifier 175 identifies that the same customer is using a different messaging platform and thus routes the message to the last agent which can be an APS or a human assistant which is operating one of the data processing systems 163. In one embodiment, the last agent router 181 provides the metadata to router 179 which can be used to route the message to the appropriate human assistant who can operate one of the data processing systems 163. Intent analyzer 177 can analyze the intent of the message for either messages having a new state or messages having a self-service state. In one embodiment, the intent analyzer can include natural language processing logic to process text in a natural language description in order to extract a likely intent or purpose of the customer's message. The result of that analysis can provide an intent which can then be used, along with the state of the conversation, to select the appropriate APS or target APS to generate a response. As explained relative to FIG. 6A, the selection of the target APS can depend upon or be based upon the combination of the domain and intent that was extracted by the intent analyzer 177 or in another embodiment can be based upon a combination of intent, state, and domain in order to select the target APS. FIG. 5D shows an example of the set of message adaptors which can be similar to the set of message adaptors 151 shown in FIG. 4. In the example shown in FIG. 5D, each message adaptor can include a message services component 253 which can be configured to retrieve messages by conversation ID or by messaging platform and handle, etc. These messaging services, such as messaging services 253 which are part of the message adaptors 251 can also archive messages and conversations and retrieve archive messages by conversations.

FIG. 5A shows an example of a state diagram for a session or conversation. In the diagram 201, all conversations begin with the new state 203 and transition to either the self-service state 205 or the in-conversation state 207. The self-service state 205 can transition to the in-conversation state 207 or to the end state 211. The in-conversation state 207 can transition to either the end state 211 or the cross-channel state 209.

FIGS. 5B and 5C show an example of two specific routing tables which can be used by a messaging manager as described herein to route messages. FIG. 5B shows an example of routing messages to human assistants, and FIG. 5C shows an example of how conversation timeouts and session timeouts and whether or not a handoff is requested can be used to determine the next state from the current state. In the case of FIG. 5B, the next state is determined from the current state based upon a condition and based upon the availability of the human assistant. In the case of the example shown in FIG. 5C, the next state is based upon timeout values as well as whether a handoff was requested. An example of a request for a handoff is described relative to operation 115 in which a particular APS receives a further message and determines that it cannot handle the further message and requests the messaging manager to select a new target APS or human assistant. A messaging manager, such as messaging manager 25 or messaging manager 153 can use the routing table shown in FIG. 5C to route messages to the appropriate target APS or human assistant.

FIG. 6B shows an example of conversation timeouts that can be used in selecting a state for a conversation or in routing a message in a conversation. In one embodiment, certain messages from customers can be of higher value to the business than other messages. For example, a message in the domain of retail sales with an intent of buy suggests the customer wants to buy a new product or service, in which case the conversation timeout can be set at a higher number, such as 48 hours than an intent to find a store (store locator) from a service domain which can have for example a conversation timeout of four hours. In one embodiment, the conversation timeout can used to reset a conversation from an existing state to a new state if the time between messages in a conversation exceeds the conversation timeout value. In one embodiment, the messaging manager can store time data for each message in a conversation, and can compare the time data to one or more conversation timeout values. Based upon that comparison, the messaging manager can change the state of the conversation if the time data indicates that the time between consecutive messages in the conversation exceeds the one or more conversation timeout values. Thus, if a user had sent a text message requesting a store location in a certain area, and the next message was more than four hours after the first message, the conversation would begin with the new conversation state as opposed to an existing conversation state; on the other hand if that same user had followed up the first request for a location of the store with a new message within three hours of the first message then the conversation would remain in an existing conversation state as opposed to a new conversation state. The conversation timeout values can depend upon in one embodiment both the domain and the intent. In another embodiment, the conversation timeout values and session timeout values can depend upon the combination of domain, intent, and state.

FIG. 6C shows an example of a payload of session data which in one embodiment can be stored by a messaging manager and provided to each APS when the APS is the targeted APS or to a data processing system of a human advisor. As shown in FIG. 6C, the session data in the payload can include the previous state, an identifier of the human advisor if any for the last response, an identifier of the last message sent and the time and date of the message, the conversation identifier, the intent (current) of the conversation, an indication of whether or not the conversation is a multi-user conversation, the customer identifier, the location or locale of the customer, and a message sequence number which can be used to allow an APS to determine the sequence and time of messages so that it can handle out-of-sequence messages. In one embodiment, an APS can handle out-of-sequence messages by either responding with "I don't understand" or by selecting a message to respond to which may be the last one and ignoring the others that are earlier in time.

FIG. 7 shows an example of a decision tree which can be used in an autonomous processing system. In the example shown in FIG. 7, the intent has been determined to be accessories as shown by intent 401. In one embodiment, the intent can be determined by intent analyzer 177 shown in FIG. 4 which can process the text received from the customer to determine that the customer is interested in accessories. Intent 401 in effect selects a particular tree that is used in the autonomous processing system which is shown as tree 400 in FIG. 7. The autonomous processing system can use the tree to select the appropriate response shown in node 403 of the tree. In this response, the autonomous processing system responds with a message that requests the customer to identify a category of products. The customer can then respond to the message indicated by node 403 with an identifier of a category of products. That message from the customer which contains the input from the customer of the category of the product is routed back to the tree 400. If the input from the customer is recognized then node 405 selects one of the appropriate three nodes 412, 414, and 416 for the next response to the customer. On the other hand, if the input cannot be recognized, then node 407 follows node 403 which causes the response shown in 409 which in this embodiment can cause routing of the message and conversation to a human advisor.

Figure 9A:
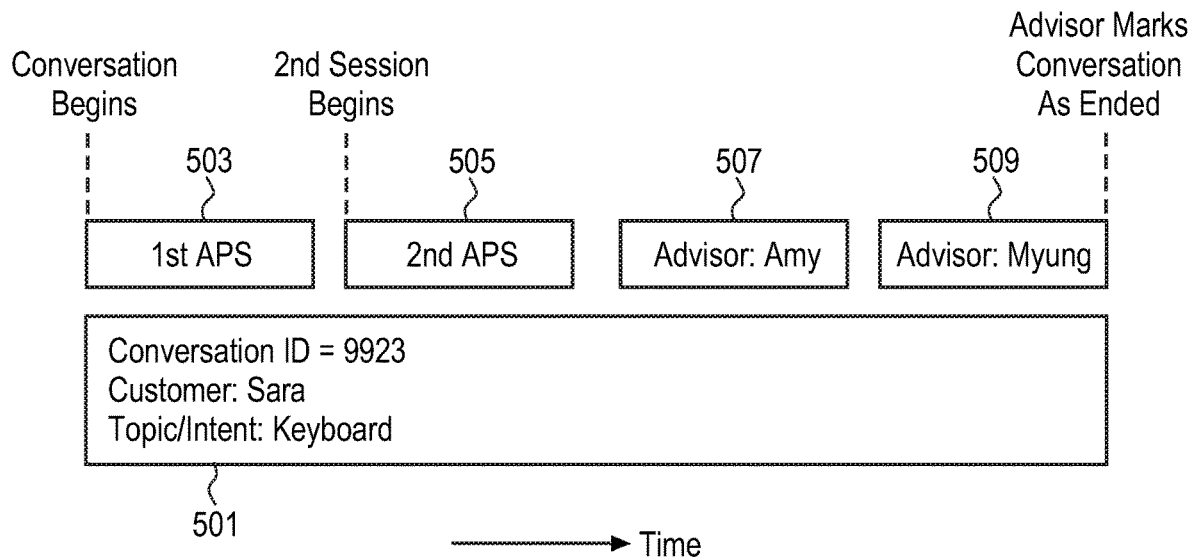
FIG. 9A shows an example of a single conversation which includes multiple sessions with multiple autonomous processing systems and multiple human advisors.
Figure 9B:
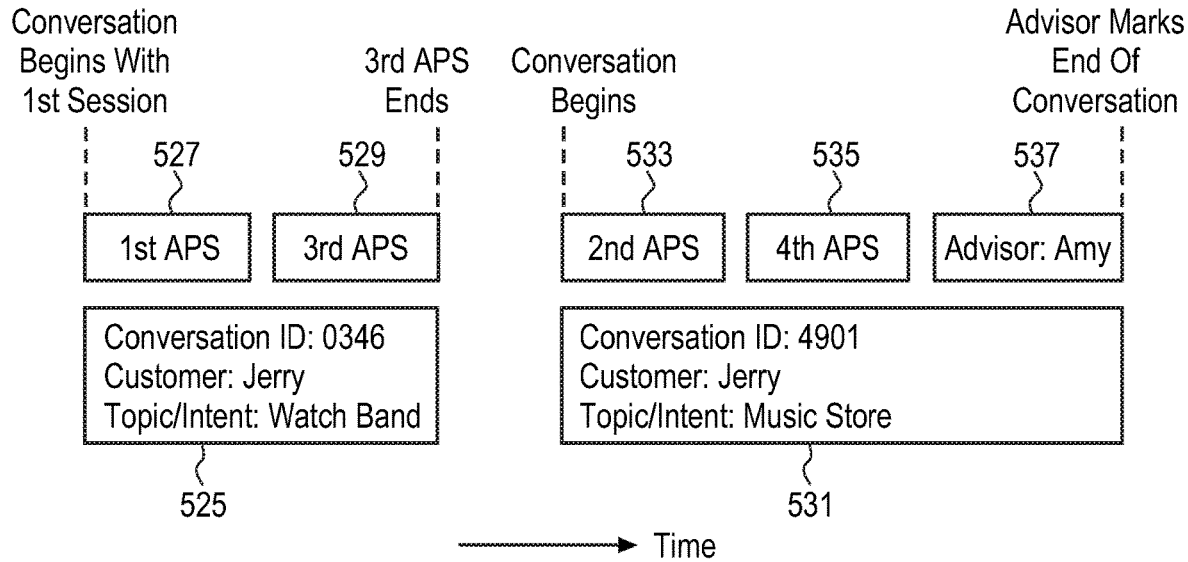
FIG. 9B shows an example of multiple sessions and multiple conversations with the same customer according to one embodiment.

FIG. 8 provides an example of conversation and session data which can be stored by a messaging manager in order to manage messages and in order to transition between states and to route messages and to select a target autonomous processing system from a set of autonomous processing systems as well as select and route a message to a data processing system operated by a human advisor or assistant. Customer ID or customer identifier can be the customer identifier stored in customer data 157 of FIG. 4 or customer data in storage 29 of FIG. 1. The customer data can be associated with or bound to one or more of: (1) one or more social media handles, or (2) one or more email addresses, or (3) one or more phone numbers of the customer, or (4) a business identifier. The media type can indicate the current messaging platform that is being used by the conversation. The conversation identifier or conversation ID can be an identifier that is used from the start to the end of the conversation and can be used to identify the conversation, and examples of such conversation identifiers are shown in FIGS. 9A and 9B. A session identifier or session ID can be an identifier of a particular set of consecutive messages in an active dialogue before a timeout. Business unit ID can be an identifier that can indicate the domain in one embodiment within a business. The state value can indicate the current state of the conversation. cStart and cEnd can be time stamps which indicate when a conversation starts or ends. In one embodiment, the end time stamp (cEnd) can be pre-populated to be the conversation timeout value and can be updated with every update. sStart and sEnd can be time stamps indicating when the session starts or ends respectively. In one embodiment, the end time stamp can be pre-populated to be the session timeout value and can be updated with every update. These time values can be used with the conversation timeout values and session timeout values as described herein to change the state of a conversation. Session information can be in one embodiment information used by systems to store their internal data for further state processing or reporting. Pay provisioned data can indicate whether or not the customer is provisioned to pay and the methods of payment. Customer ID binding can indicate whether or not the customer identifier or ID is bound to, for example, one or more social media handles or customer phone numbers or customer email addresses, etc. Original intent indicates the first intent for this conversation as the original intent, and in one embodiment the intent field can change based on natural language processing rules. The intent data is the current intent of the conversation which in one embodiment remains constant throughout a conversation. Last update time is a time stamp in one embodiment which indicates when the session was last updated. Locale or location is data indicating one or both of a locale or physical location of the customer. Message sequence number indicates one or more sequence numbers for messages in the conversation, and these message sequence numbers are assigned based upon the time of receipt of each message so that a target APS can handle out-of-sequence messages.

Domain in one embodiment can be similar to the business unit identifier or can identify a group of business units within a business, etc. The disposition and disposition message data can indicate in one embodiment a reason and description for the conversation and the session ending.

FIG. 9A shows an example of how a single conversation, with a single conversation identifier can overlap multiple sessions with multiple autonomous processing systems and multiple human advisors all within the single conversation. In this example, conversation 501 has a single intent or topic for the customer identified by the identifier Sara. The conversation 501 begins with a session between Sara and the first APS and is shown as session 501 which can include a plurality of messages exchanged back and forth between Sara and the first APS. Sometime after the end of the first session shown as session 503, session 505 begins in which the second APS exchanges messages with Sara. This transition between the first session with the first APS and the second session with the second APS is similar to the handoff which occurs in operations 115, 117, and 119 in FIG. 3 in which the first APS indicates to the messaging manager that it can no longer handle a new message and requests the messaging manager to select a new target APS which in the case of FIG. 9A is the second APS. Then, sometime after the end of session 505, session 507 begins with the human advisor Amy. This can result from the second APS indicating a request to transfer to a human advisor. The conversation can continue in another session 509 with another human advisor which can occur as a result of the first human advisor (Amy) becoming unavailable when a message is received from Sara either as a result of the timeout of session 507 or as a result of Amy becoming unavailable. In one embodiment, the messaging system can measure the real-time metrics that can help predict the optimum concurrency of a human advisor. For example, the system can keep track of agent response time which can be the time between when a message is received and when the response from the human advisor is sent back to the customer. The system can also keep track of agent wait time which can be the time between when the message was received and when the agent started to work on it. The system can also keep track of agent idle time which can be time between when a message was sent by the human advisor and waiting for the customer to respond. Further, the system can keep track of customer's response time which can be the time between when a message was sent by the system and when the next message was sent by or received from the customer.

FIG. 9B shows an example of multiple sessions and multiple conversations with the same customer. Conversation 525 can begin with the session 527 in which the customer Jetty exchanges messages with a first APS on the topic or intent of a watchband, and this conversation has a particular conversation identifier. The conversation continues with a session 529 with a third APS and ends at the end of session 529. Later in time, the customer Jerry has a different conversation, with a different conversation identifier on a different topic (music store). Session 533 begins the conversation in which multiple messages can be exchanged between Jerry and the second APS. Then a second session can begin, shown as session 535 in which Jerry exchanged messages with the fourth APS. Finally, Jerry can exchange messages with a human advisor in session 537.

In one embodiment, session or conversation timeouts can be based upon an intrinsic value to the business. In another embodiment, the conversation or session timeouts can be aligned with a customer's expectation of response time by the business for the specific messaging platform. For example, the expectation for a response by email may be days whereas the expectation for responses by chat or text messages may be in minutes. In one embodiment, the messaging manager allows a business to present a unified single view of the business to its customers even though the responses to the customer are being served by multiple autonomous processing systems which have potentially been trained by different departments or business units within the business. This allows for various departments to set up and train their autonomous processing systems for specific domains and maintain user experiences which appear unified. For example, the support team or business unit within a business can have a different autonomous processing system than a retail sales team which uses a different autonomous processing system.

In one embodiment a messaging manager can enforce policies including, for example, the autonomous processing systems which are available to use based upon domain and/or intent; or based upon timeout values for conversations by one or more of state, intent, and messaging platform and the messaging manager can also enforce policies based upon the sequencing of the messages by using message sequence numbers as described herein.

In one embodiment, the autonomous processing systems can be used based on a set of business logic rules to respond to customers, where the rules set describe a sequence or flow from one APS to the next as a customer receives service. For example, a first APS can function as a receptionist and cause the customer to be directed to the next APS in a sequence based on the customer's messages, and the next APS can, based on the sequence in the rules (and the customer's messages), cause the customer to be directed to another APS. Moreover, the rules can also use the functionality of a set of APSs to decide how to route the messages where a message requiring a certain function is routed to the APS that can provide that function.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, a server farm, desktop computers, embedded electronic devices, or other consumer electronic devices.

Figure 10:
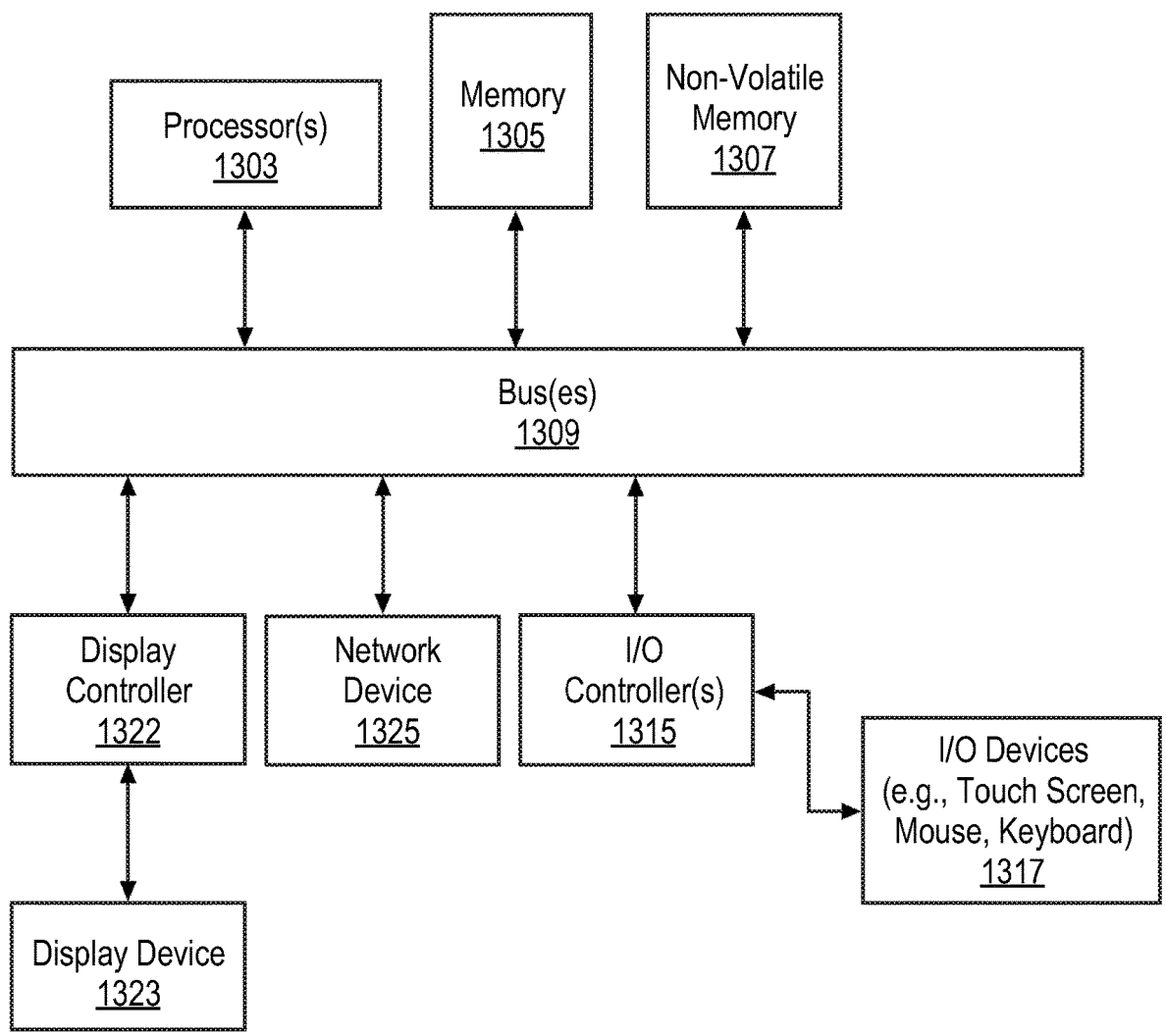
FIG. 10 shows an example of a data processing system which can be used to implement the various systems such as those shown in FIG. 1 or FIG. 4.

FIG. 10 is a block diagram of data processing system hardware according to an embodiment. Note that while FIG. 10 illustrates the various components of a data processing system that may be incorporated into a mobile or handheld device or other electronic device, it is not intended to represent any particular architecture or manner of interconnecting the components as such details are not germane to the present invention. It will also be appreciated that other types of data processing systems that have fewer components than shown or more components than shown in FIG. 10 can also be used with the present invention.

As shown in FIG. 10, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems (e.g., ROM) that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 10 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adaptors as is well known in the art In one embodiment the I/O controller 1315 includes one or more of a USB (Universal Serial Bus) adaptor for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network devices) 1325 can be wired network devices (e.g., Ethernet) or wireless network devices (e.g., WiFi, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

Appendix A shows an example of application programming interfaces which can be used to establish an interface between one or more autonomous processing systems and a messaging manager. These application programming interfaces may be useful in cases where the autonomous processing system is operated by an organization which is different than the organization or business that operates the messaging system which includes the messaging manager.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable media storing executable program instructions which when executed by one or more data processing systems cause the one or more data processing systems to perform a method comprising:
receiving a first message directed to a first organization from a device of a user, the first message having a first message type;
selecting, based on the first message type, a first autonomous processing system to respond to the first message, wherein the first autonomous processing system is configured to automatically generate responses solely to the first message type;
routing the first message to the first autonomous processing system;
transmitting, to the device of the user, a response to the first message generated by the first autonomous processing system;
receiving a second message directed to the first organization from the device of the user or a device of another user, the second message having a second message type that differs from the first message type;
selecting, based on the second message type, a second autonomous processing system to respond to the second message, wherein the second autonomous processing system is configured to automatically generate responses solely to the second message type;
routing the second message to the second autonomous processing system; and
transmitting, to the device of the user or the device of the other user, a response to the second message generated by the second autonomous processing system.

2. The media as in claim 1 wherein the selecting is performed by a messaging manager that manages communication of messages without a persistent connection during conversations that include the messages, and wherein the first autonomous processing system is configured to update first metadata for a first conversation of the first type and the second autonomous processing system is configured to update second metadata for a second conversation of the second type, and wherein the messaging manager is configured to store the updated first metadata after the response to the first message has been transmitted and is configured to store the updated second metadata after the response to the second message has been transmitted, and wherein the first type is for a customer interaction of a first intent or purpose and the second type is for a customer interaction of a second intent or purpose.

3. The media as in claim 2 wherein the messaging manager creates new metadata for a new conversation in response to determining one of the first message or the second message is an initial message in a new conversation.

4. The media as in claim 2 wherein the selecting by the messaging manager of the first autonomous processing system is based on the first metadata that is associated with the first message and the selecting by the messaging manager of the second autonomous processing system is based on the second metadata that is associated with the second message.

5. The media as in claim 4 wherein the first autonomous processing system is configured for generating responses by a first business unit within the first organization and the second autonomous processing system is configured for generating responses by a second business unit within the first organization.

6. The media as in claim 4 wherein the first message is received through a first messaging platform and the second message is received through a second messaging platform and wherein the first messaging platform and the second messaging platform are different and are one of: text (SMS) messaging; or iMessage; or web chat; or chat within an application; or email; or voice; or Twitter; or WeChat; or Facebook Messenger; or Snapchat; or voice messaging; or video messaging.

7. The media as in claim 2 wherein the first autonomous processing system does not retain the updated first metadata after the response to the first message is transmitted, and the second autonomous processing system does not retain the updated second metadata after the response to the second message is transmitted.

8. The media as in claim 2 wherein the messaging manager stores session data that includes the first metadata before the response to the first message is transmitted and includes the updated first metadata after the response to the first message is transmitted and wherein at least a portion of the session data is provided to the first autonomous processing system prior to transmitting the response to the first message, and wherein the session data includes one or more of: (1) session state; (2) identifier of human assistant in most recent response; (3) time data for the last message and indicator of sender of most recent message; (4) conversation identifier; (5) intent of a conversation; (6) metadata from the first autonomous processing system; (7) message sequence numbers; (8) customer identifier; or (9) customer location.

9. The media as in claim 1 wherein the first message is received through a first messaging platform from a first customer corresponding to the user and the second message is received through a second messaging platform from the first customer, the first message and the second message being part of the same conversation and the second message represents a cross-channel message.

10. The media as in claim 2 wherein the first message is received through a first messaging platform from a first customer corresponding to the user and engaged in the first conversation of the first intent and the second message is received through a second messaging platform from a second customer corresponding to the other user and engaged in the second conversation of the second intent.

11. The media as in claim 1 wherein the routing is dependent on session state and data specifying customer intent, and wherein all routing is specified by the session state and data specifying customer intent for each message and the routing is performed without a persistent communication channel during a conversation.

12. The media as in claim 1 wherein the first autonomous processing system receives a third message routed to the first autonomous system and determines the third message cannot be processed by the first autonomous processing system and then forwards the third message to at least one of another autonomous processing system or a messaging manager or a human customer service assistant.

13. The media as in claim 12 wherein the first message and the third message are part of a single conversation that is maintained across either (1) the first autonomous processing system and the another autonomous processing system if the third message is forwarded to the another autonomous processing system or (2) the first autonomous processing system and the human customer service assistant if the third message is forwarded to the human customer service assistant.

14. The media as in claim 1 wherein the first message is from a first customer, corresponding to the user, that is identified, within the first organization, by a first customer identifier, and the first customer identifier is associated with one or more of: (1) one or more social media handles, or (2) one or more email addresses, or (3) one or more phone numbers, and wherein the association allows the first organization to determine the first customer identifier from the first message.

15. The media as in claim 1 wherein the method further comprises:
    storing time data for each message in a conversation;
    comparing the time data to one or more conversation timeout values; and
    changing a state of the conversation if the time data indicates a time between consecutive messages in the conversation exceeds the one or more conversation timeout values.

16. The media as in claim 15 wherein the state of the conversation is changed to a new conversation state and wherein metadata for the conversation is saved to allow a new conversation to resume using a state indicated by the metadata.

17. The media as in claim 16 wherein the metadata includes one or more of: (1) identifier of one or more human assistants involved in the conversation before the state was changed; or (2) identifier of one or more possible purchases of products or services involved in the conversation before the state was changed.

18. The media as in claim 15 wherein a first timeout value for a first conversation of a first intent differs from a second timeout value for a second conversation of a second intent, and wherein a third timeout value for a third conversation conducted over a first messaging platform differs from a fourth timeout value for a fourth conversation conducted over a second messaging platform.

19. The media as in claim 1 wherein each message in a conversation has a unique sequence number within the conversation to identify a sequence in time of receipt of the messages and wherein the conversation is associated with a conversation identifier that identifies the conversation from the start of the conversation to the end of the conversation.

20. The media of claim 1, wherein the second autonomous processing system is different from the first autonomous processing system.

21. The media of claim 1, wherein the second autonomous processing system is separate from the first autonomous processing system.

22. A set of one or more data processing systems for managing conversations, the set comprising:
    a set of message adaptors, each configured to receive and send messages on a particular messaging platform;
    a messaging manager coupled to the set of message adaptors and coupled to a message repository;
    a first autonomous processing system (first APS) configured to process and automatically generate responses solely to messages of a first type, the first autonomous processing system coupled to the messaging manager and coupled to the set of message adaptors;
    a second autonomous processing system (second APS) configured to process and automatically generate responses solely to messages of a second type, the second autonomous processing system coupled to the messaging manager and coupled to the set of message adaptors;

wherein the messaging manager is configured to select the first APS to respond to the first message based on the first type, as indicated in metadata associated with the first message;

and wherein the messaging manager is configured to select the second APS to respond to the second message based on the second type, as indicated in metadata associated with the second message.

23. A device comprising:

a memory; and at least one processor configured to:
- receive a first message directed to a first organization from a device of a user, the first message having a first message type;
- select, by a messaging manager that manages communication of messages and based on the first message type, a first autonomous processing system to respond to the first message, wherein the first autonomous processing system is configured to automatically generate responses solely to the first message type;
- route the first message to the first autonomous processing system;
- transmit a response to the first message generated by the first autonomous processing system;
- receive a second message directed to the first organization from the device of the user or a device of another user, the second message having a second message type that differs from the first message type;
- select, by the messaging manager and based on the second message type, a second autonomous processing system to respond to the second message, wherein the second autonomous processing system is configured to automatically generate responses solely to the second message type, the second autonomous processing system being different and separate from the first autonomous processing system;
- route the second message to the second autonomous processing system; and
- transmit, to the device of the user or the device of the other user, a response to the second message generated by the second autonomous processing system.

24. The device as in claim 23, wherein the first autonomous processing system is configured to update first metadata for a first conversation corresponding to the first message type and the second autonomous processing system is configured to update second metadata for a second conversation corresponding to the second message type.

25. The device as in claim 24, wherein the messaging manager is configured to store the updated first metadata after the response to the first message has been transmitted and to store the updated second metadata after the response to the second message has been transmitted.

26. The device as in claim 25 wherein the first message type corresponds to a customer interaction of a first intent or purpose and the second message type corresponds to a customer interaction corresponding to a second intent or purpose that differs from the first intent or purpose.

27. The device as in claim 23, wherein the messaging manager manages communication of messages without a persistent connection during conversations that include the messages.

* * * * *